July 29, 1924.

W. L. YOUNG

ELECTRIC HEATER

Filed June 30, 1921

1,502,932

Inventor:
Wilbur L. Young,
by Albert G. Davis
His Attorney

Patented July 29, 1924.

1,502,932

UNITED STATES PATENT OFFICE.

WILBUR L. YOUNG, OF FORT WAYNE, INDIANA, ASSIGNOR TO GENERAL ELECTRIC COMPANY, A CORPORATION OF NEW YORK.

ELECTRIC HEATER.

Application filed June 30, 1921. Serial No. 481,492.

*To all whom it may concern:*

Be it known that I, WILBUR L. YOUNG, a citizen of the United States, residing at Fort Wayne, in the county of Allen, State of Indiana, have invented certain new and useful Improvements in Electric Heaters, of which the following is a specification.

My invention relates to electric heaters and has for its object the provision of simple and reliable means for heating tools and other metallic articles by means of electric current.

More specifically my invention relates to electric heaters for soldering irons and other portable tools. The usual method of electrically heating tools involves the use of an electric conductor attached thereto which in certain cases has been found to be a great inconvenience in the use of the tool.

In carrying out my invention I employ a small portable transformer which may be attached to an alternating current lighting circuit for supplying low voltage to one or more pairs of spaced electrodes suitably connected to the terminals of the transformer and insulated from each other. At least one of the electrodes is yieldably mounted so that the soldering iron or other tool may be placed between the two electrodes and maintained in contact therewith. The circuit of the electrodes is closed through the soldering iron, and the soldering iron is heated by the heat generated by the high resistance of the electrodes, which is transmitted by conduction to the soldering iron. I have also provided heavy metallic bases for the electrodes which serve as heat reservoirs to facilitate the rapid heating of the soldering iron or other tool.

Figure 1:
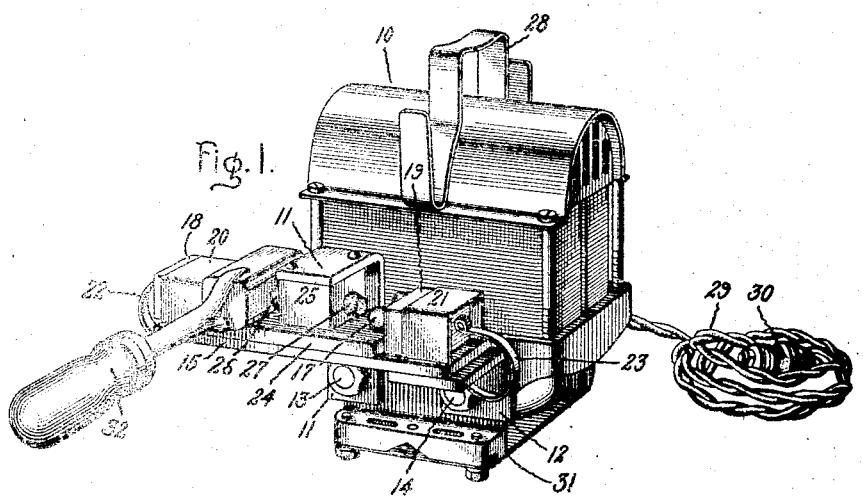
Figure 2:
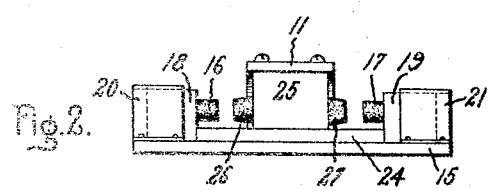
Figure 3:
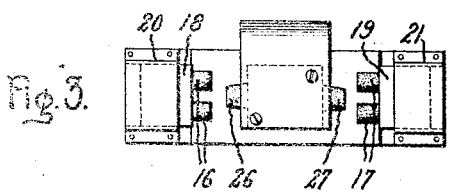

In the accompanying drawing, Fig. 1 is a perspective view of an electric heater constructed in accordance with my invention; Fig. 2 is an elevation view of the heating electrodes; while Fig. 3 is a plan view of Fig. 2.

Referring to the drawings, the transformer 10 has brackets 11 and 12 of suitable electrically conducting material attached thereto, and electrically connected to its low voltage terminals 13 and 14, respectively, in insulated relation to each other and to the frame of the transformer. Attached to bracket 12 is a rectangular conducting strip 15 mounted in a horizontal position and carrying two pairs of slidably mounted carbon electrodes 16 and 17 adjacent its ends, respectively. The electrodes 16 and 17 are mounted in relatively large blocks 18 and 19 forming bases, of suitable heat conducting material, such as copper, and are held in slidable relation to the conducting strip 15 by means of bands or straps 20 and 21 attached to strip 15 and loosely surrounding the bases, respectively. The electrodes 16 and 17 are yieldably biased towards each other by means of springs 22 and 23 attached to strip 15 and bracket 12, respectively, and cooperating with the metallic blocks. Between the movable electrodes and mounted on strip 15 is a rectangular plate of insulating material 24, against the ends of which the bases 18 and 19 are spring-pressed when the heater is not in operation. Mounted on this insulating plate so as to be insulated from strip 15 and electrodes 16 and 17 is another block or base of suitable heat conducting material 25 having embedded therein a length of carbon electrode material which projects at opposite sides thereof to form electrodes 26 and 27. The conducting bracket 11 extends upward over the block 25 to which it is electrically connected. Bracket 11 also serves as a support for plate 15 and the electrodes in addition to bracket 12. The electrodes 16 and 17 are in staggered relation with and opposite electrodes 26 and 27, respectively. This staggered relation provides for convenience in replacing the electrodes. Electrodes 16 and 17 are normally held out of contact with electrodes 26 and 27, respectively, by the engagement of bases 18 and 19 with the ends of the insulating strip 24. It will be observed that the strip 15 forms a support for the electrodes, and as will presently appear for the heated article as well.

By means of a handle 28 attached to the transformer, the heating unit may be carried to a position convenient to the work. A twin conductor lead 29 is connected to the high voltage coil of the transformer and provided with an attachment plug 30 adapted for the usual plug receptacle or lighting socket. The transformer is provided with a suitable base 31 upon which the transformer is adapted to rest with the supporting strip 15 in a horizontal position, as shown in the drawing.

As thus constructed and arranged, the operation of my invention is as follows: Upon the connection of the plug 30 to a source of alternating current, the transformer is energized and low voltage supplied to the electrodes, each set of cooperating electrodes being of opposite polarity. If it is desired to heat a soldering iron, it is placed upon the insulating plate 24 into engagement with and between one of the two sets of electrodes. As shown in the drawing, the soldering iron 32 is in heating position between the electrodes 16 and 26, the electrodes being held in contact with the soldering iron by spring 22. The heating circuit is thus closed through the body of the soldering iron, and the carbon electrodes will be quickly heated by reason of their high resistance so as to heat the soldering iron by conduction thereto. No arc is formed for the reason that the voltage is not sufficiently high to generate an arc. By providing two sets of electrodes, two soldering irons can be heated at the same time if desired.

During the heating operation the heavy copper blocks 18 and 25 are likewise heated by conduction from the electrodes and serve the purpose of a heat reservoir so that when a cold soldering iron is introduced in heating position, the copper blocks will rapidly give up their stored heat to the soldering iron, thus facilitating the heating operation.

By yieldably mounting the electrodes 16 and 17, I not only assure contact with the soldering iron when it is inserted in heating position, but I am enabled to heat various sizes of soldering irons by means of the same apparatus.

It will be observed that by means of my invention I have provided very simple and reliable means for accomplishing the objects thereof. The apparatus may be constructed of light weight so as to be easily conveyed to the most advantageous position. There is no danger from the fire and explosion hazard incident to the usual type of gas heaters, nor is there any chance of the clean tip of the soldering iron, which is necessary for efficient soldering, being brought to an excessively high temperature and burnt, which may readily happen when using the gas flame. The apparatus requires practically no attention, since the placing of the soldering iron in heating position at the same time closes the heating circuit. Although I have shown and described a transformer for supplying low voltage electric current to the electrodes, obviously any suitable source of low voltage supply may be used.

My invention may be employed in the heating of any metallic articles for whatever purpose, whether it be a tool or a workpiece to be forged or otherwise heat treated, and in the appended claims I have used the term workpiece to include any or all of these articles.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. In an electric heater, the combination with a workpiece, of a support for said workpiece, and stationary and resiliently yieldable electrodes on said support adapted to engage said workpiece and heat the same.

2. In an electric heater, the combination with a workpiece, of a support for said workpiece, a stationary electrode on said support, a movable electrode on said support, and resilient means for biasing said movable electrode toward said stationary electrode, whereby the workpiece may be placed on said support between said electrodes so as to be engaged and heated thereby.

3. In an electric heater, the combination with a workpiece, of a support for said workpiece, a stationary carbon electrode on said support, a movable carbon electrode on said support, heavy metallic bases for said electrodes, and resilient means for biasing said movable electrode toward said stationary electrode whereby the workpiece may be placed on said support between said electrodes so as to be engaged and heated thereby.

4. An electric heater comprising a transformer, an insulated support attached thereto, and stationary and resiliently movable electrodes in spaced relation on said support and connected to the low voltage terminals of said transformer.

5. An electric heater comprising a transformer, an insulated support attached thereto, a stationary electrode mounted on such support, a movable electrode mounted on such support, a spring for biasing said movable electrode toward said stationary electrode, heavy metallic bases for said electrodes, and electrical connections between said electrodes and the low voltage terminals of the transformer.

6. An electric heater comprising a transformer, an insulated support attached thereto, stationary carbon electrodes on said support, pairs of movable carbon electrodes on said support cooperating with said stationary electrodes, respectively, heavy metallic bases for said electrodes, resilient means for biasing said pairs of movable electrodes toward said stationary electrodes, and electrical connections between said electrodes and the low voltage terminals of the transformer.

In witness whereof, I have hereunto set my hand this 27th day of June, 1921.

WILBUR L. YOUNG.